(12) United States Patent
Takamizawa et al.

(10) Patent No.: US 12,019,937 B2
(45) Date of Patent: Jun. 25, 2024

(54) HEAD MOUNTED PROCESSING APPARATUS

(71) Applicant: MAXELL, LTD., Kyoto (JP)

(72) Inventors: Naohisa Takamizawa, Kyoto (JP); Hitoshi Akiyama, Kyoto (JP)

(73) Assignee: MAXELL, LTD., Kyoto (JP)

( * ) Notice: Subject to any disclaimer, the term of this patent is extended or adjusted under 35 U.S.C. 154(b) by 109 days.

(21) Appl. No.: 17/601,936

(22) PCT Filed: Apr. 9, 2019

(86) PCT No.: PCT/JP2019/015501
§ 371 (c)(1),
(2) Date: Oct. 7, 2021

(87) PCT Pub. No.: WO2020/208717
PCT Pub. Date: Oct. 15, 2020

(65) Prior Publication Data
US 2022/0137908 A1 May 5, 2022

(51) Int. Cl.
*G06F 3/14* (2006.01)
*G06F 3/01* (2006.01)
*H04N 7/18* (2006.01)

(52) U.S. Cl.
CPC ............... *G06F 3/14* (2013.01); *G06F 3/012* (2013.01); *G06F 3/015* (2013.01); *H04N 7/18* (2013.01)

(58) Field of Classification Search
CPC . G06F 3/14; G06F 3/012; G06F 3/015; G06F 3/147; G06F 3/011; H04N 7/18;
(Continued)

(56) References Cited

U.S. PATENT DOCUMENTS

| 9,940,754 B2 * | 4/2018 | Kuribara | ............... G06F 3/0482 |
| 2007/0276590 A1 * | 11/2007 | Leonard | .................... G01S 5/16 |
| | | | 701/468 |

(Continued)

FOREIGN PATENT DOCUMENTS

| JP | 2007-259343 A | 10/2007 |
| JP | 2009-182473 A | 8/2009 |

(Continued)

*Primary Examiner* — William Lu
(74) *Attorney, Agent, or Firm* — MATTINGLY & MALUR, PC

(57) ABSTRACT

When an instruction from the user is received or when an event occurs and the head mounted processing apparatus is terminated, a key content pair information register is configured to associate a state of content at the time of the event occurrence with a registration key obtained from an image of a camera at the time of the event occurrence to store them in a memory as key content pair information. When the head mounted processing apparatus is activated, a key content pair restorer is configured to determine whether an image of the camera at the time of apparatus activation is made conformity with the registration key or not on the basis of the key content pair information, and restore the state of the content corresponding to the registration key made conformity with the image in a case where the image is made conformity with the registration key.

19 Claims, 14 Drawing Sheets

(58) Field of Classification Search
CPC .......... H04N 7/183; H04N 5/66; G09G 5/393; G09G 2354/00; G09G 5/395
See application file for complete search history.

(56) References Cited

U.S. PATENT DOCUMENTS

| | | | | |
|---|---|---|---|---|
| 2009/0048693 | A1* | 2/2009 | Kato | H04N 5/775 |
| | | | | 700/94 |
| 2010/0053372 | A1* | 3/2010 | Shimizu | H04N 23/88 |
| | | | | 348/231.3 |
| 2011/0239142 | A1* | 9/2011 | Steeves | G06F 3/14 |
| | | | | 345/3.1 |
| 2012/0212406 | A1* | 8/2012 | Osterhout | G06F 3/005 |
| | | | | 345/156 |
| 2016/0077606 | A1* | 3/2016 | Hyun | G06F 3/0484 |
| | | | | 345/156 |
| 2017/0148218 | A1* | 5/2017 | Lee | H04M 1/72412 |
| 2017/0150139 | A1* | 5/2017 | Lee | G06F 3/03547 |
| 2017/0236320 | A1* | 8/2017 | Gribetz | G06F 3/011 |
| | | | | 345/419 |
| 2018/0173323 | A1* | 6/2018 | Harvey | G06F 3/011 |
| 2018/0274936 | A1* | 9/2018 | Choi | H04N 7/185 |
| 2018/0315248 | A1* | 11/2018 | Bastov | G06T 19/20 |
| 2019/0121522 | A1* | 4/2019 | Davis | G06V 40/28 |
| 2019/0179148 | A1* | 6/2019 | Hori | G06F 3/04847 |
| 2019/0221191 | A1* | 7/2019 | Chhipa | G09G 3/002 |
| 2020/0356917 | A1* | 11/2020 | Sharma | G06Q 10/103 |
| 2021/0333864 | A1* | 10/2021 | Harvey | G06T 19/006 |

FOREIGN PATENT DOCUMENTS

| | | |
|---|---|---|
| JP | 2009-229859 A | 10/2009 |
| JP | 2010-062903 A | 3/2010 |
| JP | 2016-115329 A | 6/2016 |
| JP | 2018-129732 A | 8/2018 |
| JP | 2018-195110 A | 12/2018 |
| WO | 2007/037148 A1 | 4/2007 |

* cited by examiner

FIG. 5

216a: KEY CONTENT PAIR INFORMATION

| REGISTRATION KEY | CONTENT STATE |
|---|---|
| CLOCK | MOVIE "MOUNTAIN CLIMBING" + "1:10:15" |
| CALENDAR | DOCUMENT FILE |
| .... | ..... |
| ..... | ...... |

216b: KEY CONTENT PAIR INFORMATION

| REGISTRATION KEY | CONTENT STATE |
|---|---|
| (POSTURE) INSIDE OUT | MOVIE "MOUNTAIN CLIMBING" + "1:10:15" |
| (POSTURE) INSTALLATION AT LOWER RIGHT | DOCUMENT FILE |
| . . . . | . . . . . |
| . . . . . | . . . . . . |

(b)

216c: KEY CONTENT PAIR INFORMATION

| REGISTRATION KEY | CONTENT STATE |
|---|---|
| (POSTURE) INSIDE OUT + (IMAGE) CLOCK | MOVIE "MOUNTAIN CLIMBING" + "1:10:15" |
| (POSTURE) INSTALLATION AT LOWER RIGHT + (IMAGE) CLOCK | DOCUMENT FILE |
| . . . . | . . . . . |
| . . . . . | . . . . . . |

FIG. 9
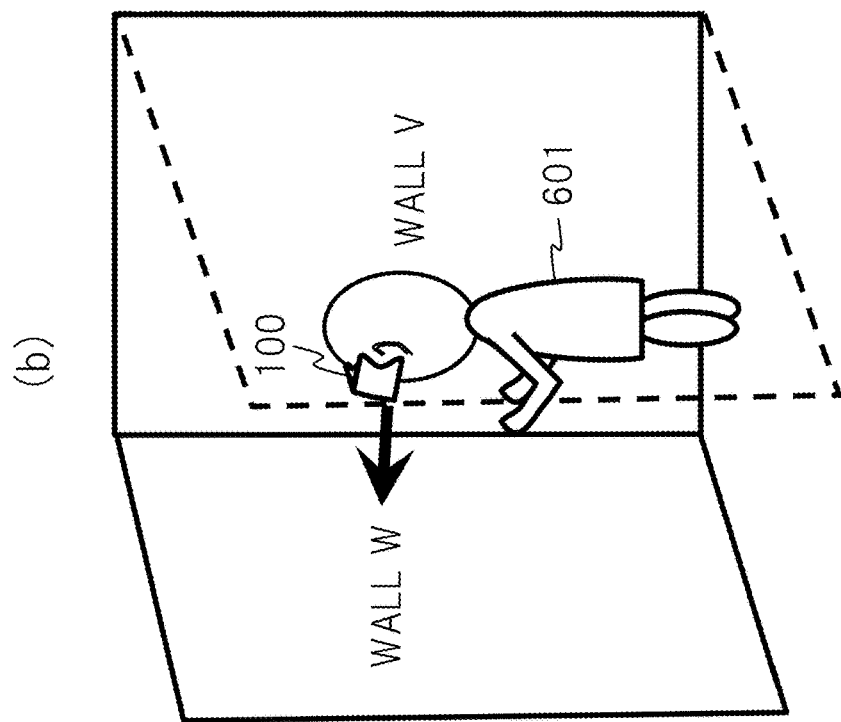
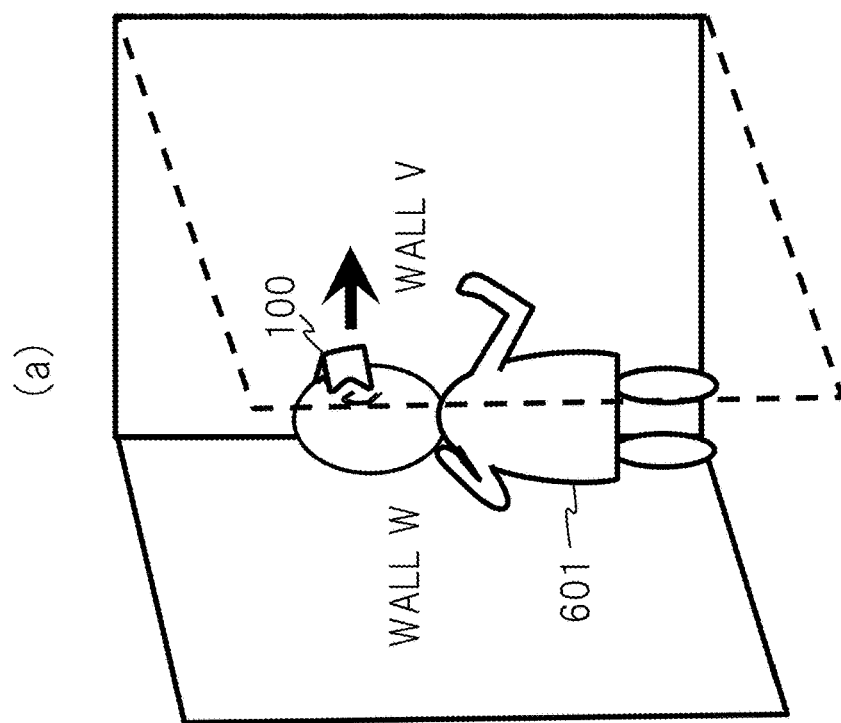

(a)

(b)

216d: KEY CONTENT PAIR INFORMATION

| REGISTRATION KEY | CONTENT STATE |
|---|---|
| SSID#1 | CONTENT A |
| SSID#2 | CONTENT B |
| .... | ..... |
| ..... | ...... |

HEAD MOUNTED PROCESSING APPARATUS

TECHNICAL FIELD

The present invention relates to a head mounted processing apparatus for providing various kinds of information to a user via a visual sense or an auditory sense in a state where the head mounted processing apparatus is worn on a head of the user.

BACKGROUND ART

Patent document 1 describes a method of switching video to be displayed in accordance with motion of a head of an occupant who wears a head mounted display apparatus for displaying video captured by a plurality of cameras configured to capture the surroundings of a vehicle.

RELATED ART DOCUMENTS

Patent Documents

Patent document 1: Japanese Patent Application Publication No. 2018-129732

SUMMARY OF THE INVENTION

Problems to be Solved by the Invention

A head mounted processing apparatus is also called an HMD (Head Mounted Display), and can display information of augmented reality (AR) or information of virtual reality (VR) on a display in a state where it is worn on a head of a user. In recent years, the head mounted processing apparatus blends a real world and a virtual world in real time and seamlessly, whereby it becomes possible for the user to experience as if a virtual object exists on the spot. Further, such a head mounted processing apparatus is equipped with a large amount of content represented by content using AR or VR.

In a case where the user selects various kinds of content mounted on the head mounted processing apparatus, the user needs to carry out a selection operation using a remote controller or the like while viewing a menu displayed on the display after wearing the head mounted processing apparatus. As a result, since it takes time to search for the remote controller and to carry out the selection operation, there is a fear to reduce convenience of the user. In particular, in a case where a hierarchy of the menu is deep, it may be necessary to search for target content. Therefore, this further reduces convenience. Further, when the user carries out such a selection operation, there is a fear to diminish user's sense of immersion on content due to the operation itself.

The present invention has been made in view of the above, and it is one of objects thereof to provide a head mounted processing apparatus capable of improving convenience of a user.

The foregoing and other objects, features and advantages of the present invention will become more readily apparent from the following detailed description of embodiments of the present invention that proceeds with reference to the appending drawings.

Means for Solving the Problem

An outline of representative invention of the present invention disclosed in the present application will briefly be explained as follows.

A representative head mounted processing apparatus is an apparatus for providing various kinds of information to a user via a visual sense or an auditory sense in a state where the head mounted processing apparatus is worn on a head of the user. The head mounted processing apparatus includes: a display configured to display a predetermined image; a camera configured to capture an image outside the head mounted processing apparatus; a memory; a content executor configured to execute content; and a content controller configured to control the content executor. The content controller includes a key content pair information register and a key content pair restorer. The key content pair information register is configured to associate, when an instruction from the user is received or when an event occur, that is, the head mounted processing apparatus is terminated, a state of the content at a time of event occurrence with a registration key obtained from an image of the camera at the time of the event occurrence, and store the state of the content at the time of the event occurrence and the registration key in the memory as key content pair information. The key content pair restorer is configured to determine, when the head mounted processing apparatus is activated, whether the image of the camera at a time of the apparatus activation is made conformity with the registration key or not on a basis of the key content pair information, and restore the state of the content corresponding to the registration key made conformity with the image in a case where the image is made conformity with the registration key.

Effects of the Invention

By briefly explaining an effect obtained by respective one of inventions disclosed in the present application, it becomes possible to improve convenience of a user in a head mounted processing apparatus.

BRIEF DESCRIPTIONS OF THE DRAWINGS

FIG. 5 is a schematic view illustrating a configuration example of key content pair information illustrated in FIG. 2;

Figure 2:
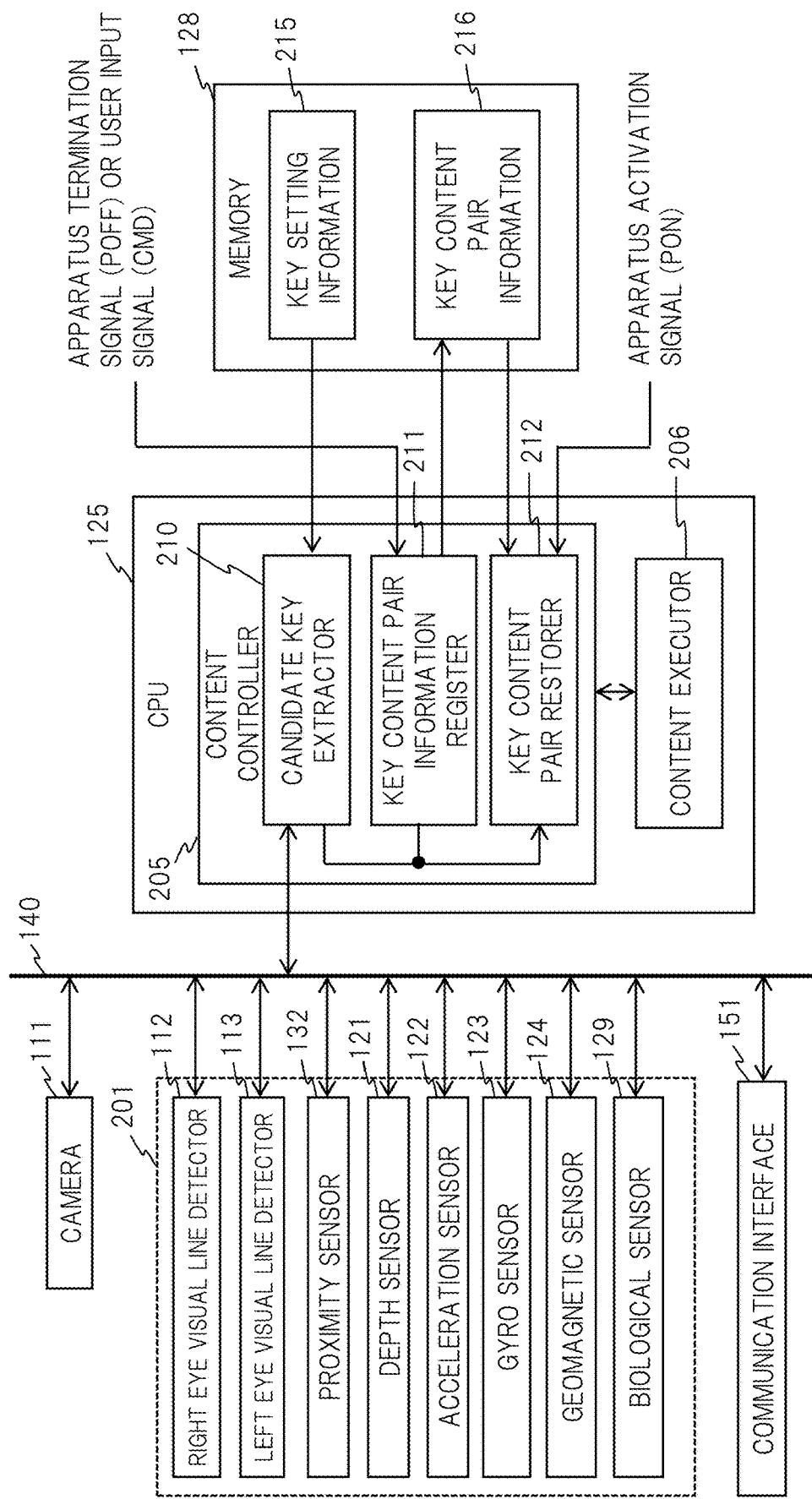
FIG. 2 is a block diagram illustrating a configuration example of main parts around a CPU illustrated in FIG. 1.
Figure 10:
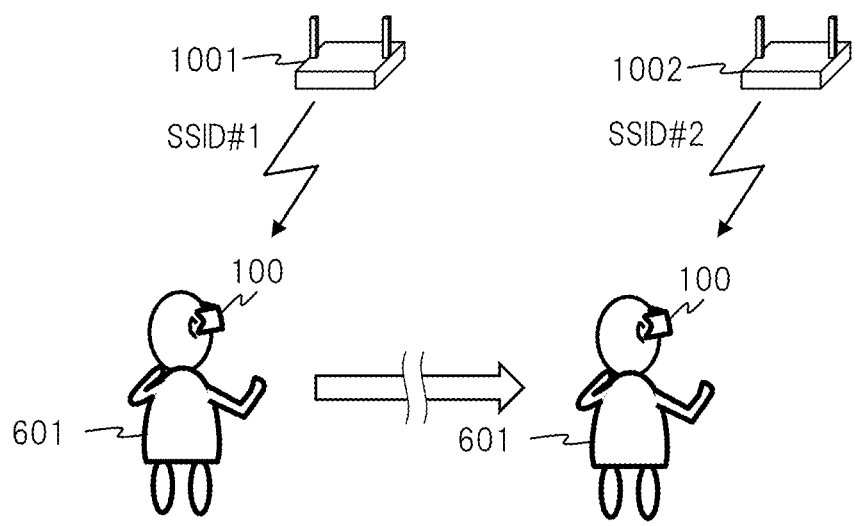
Figure 11:
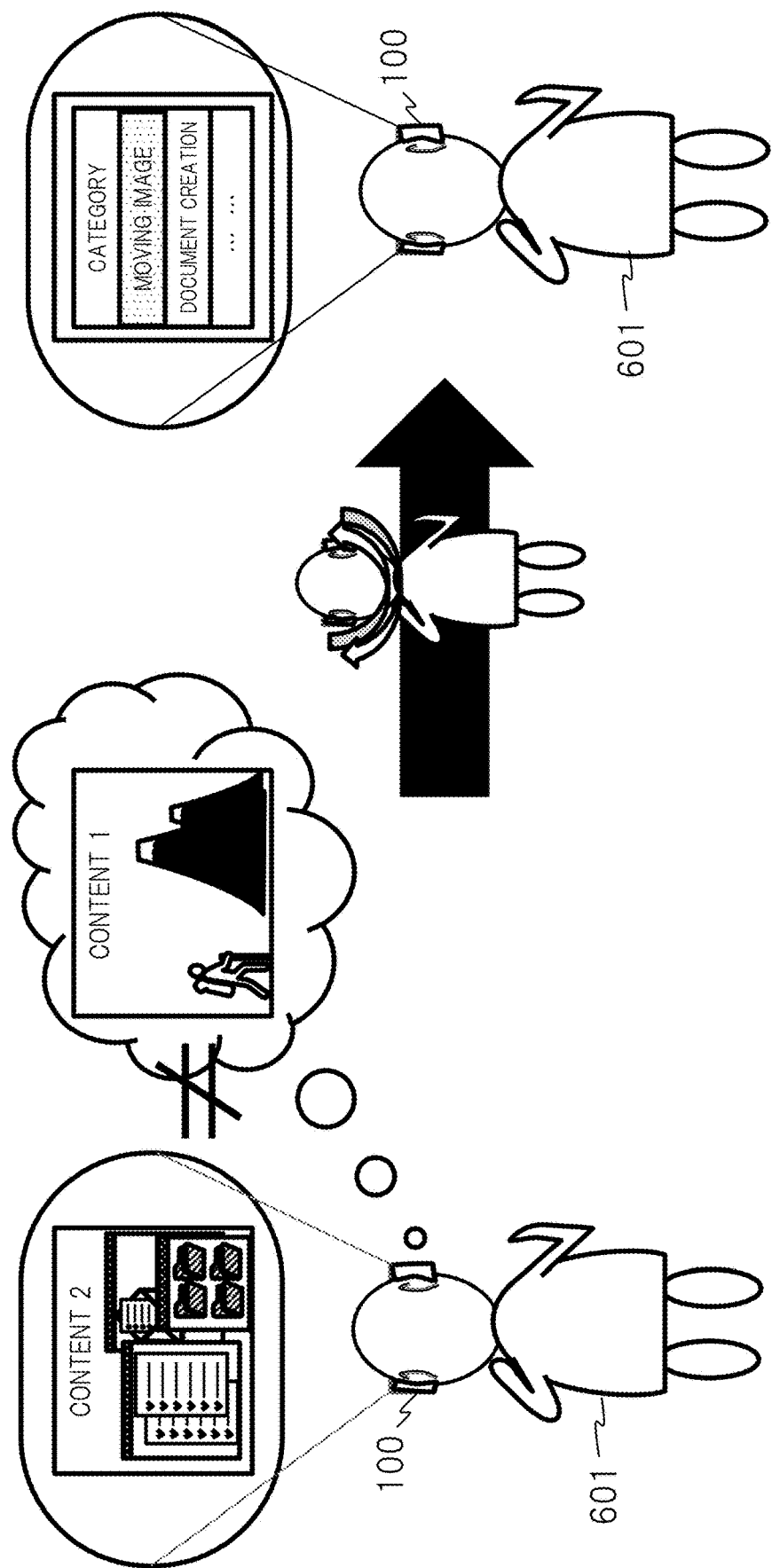
Figure 13:
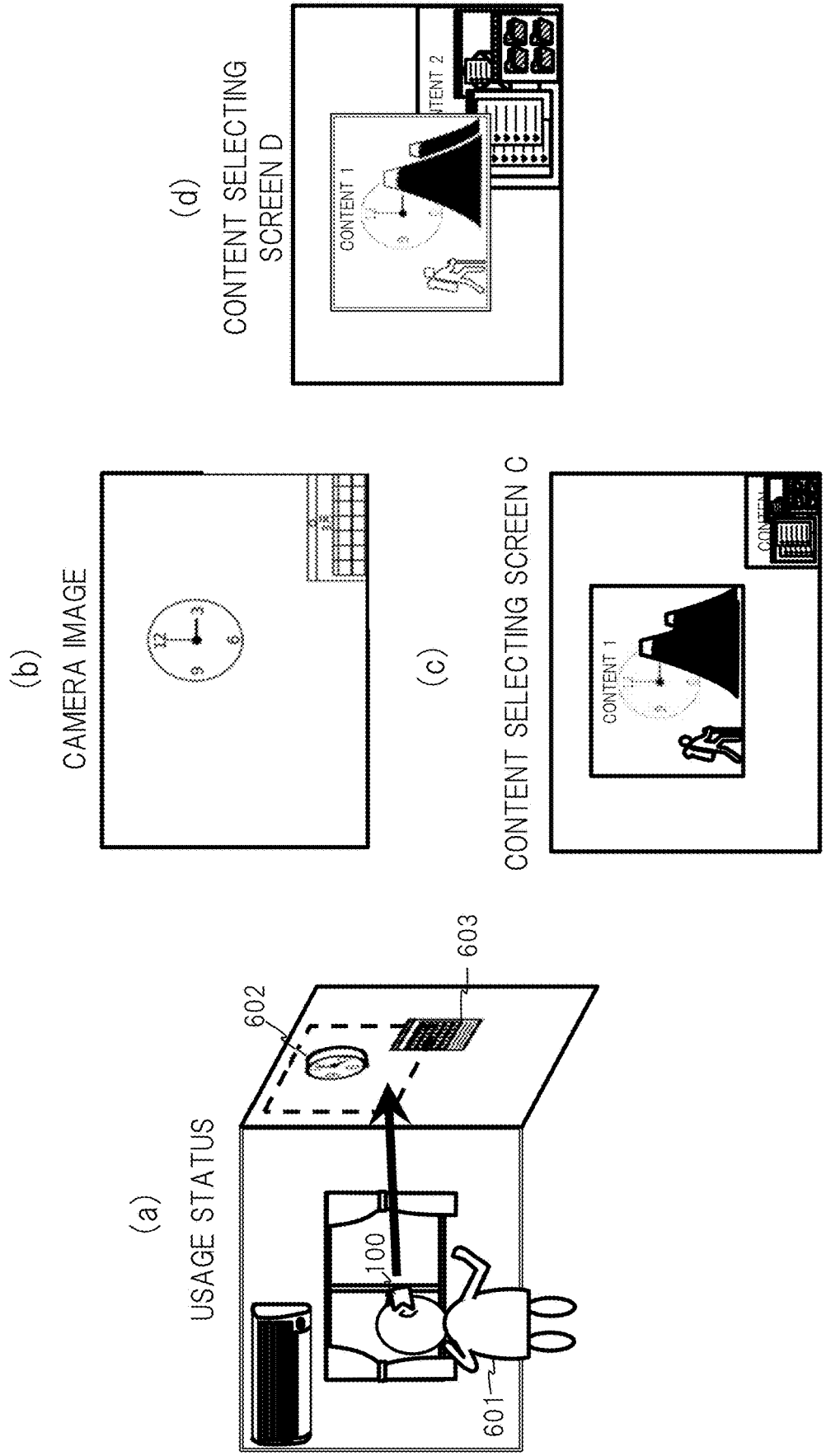
Figure 14:
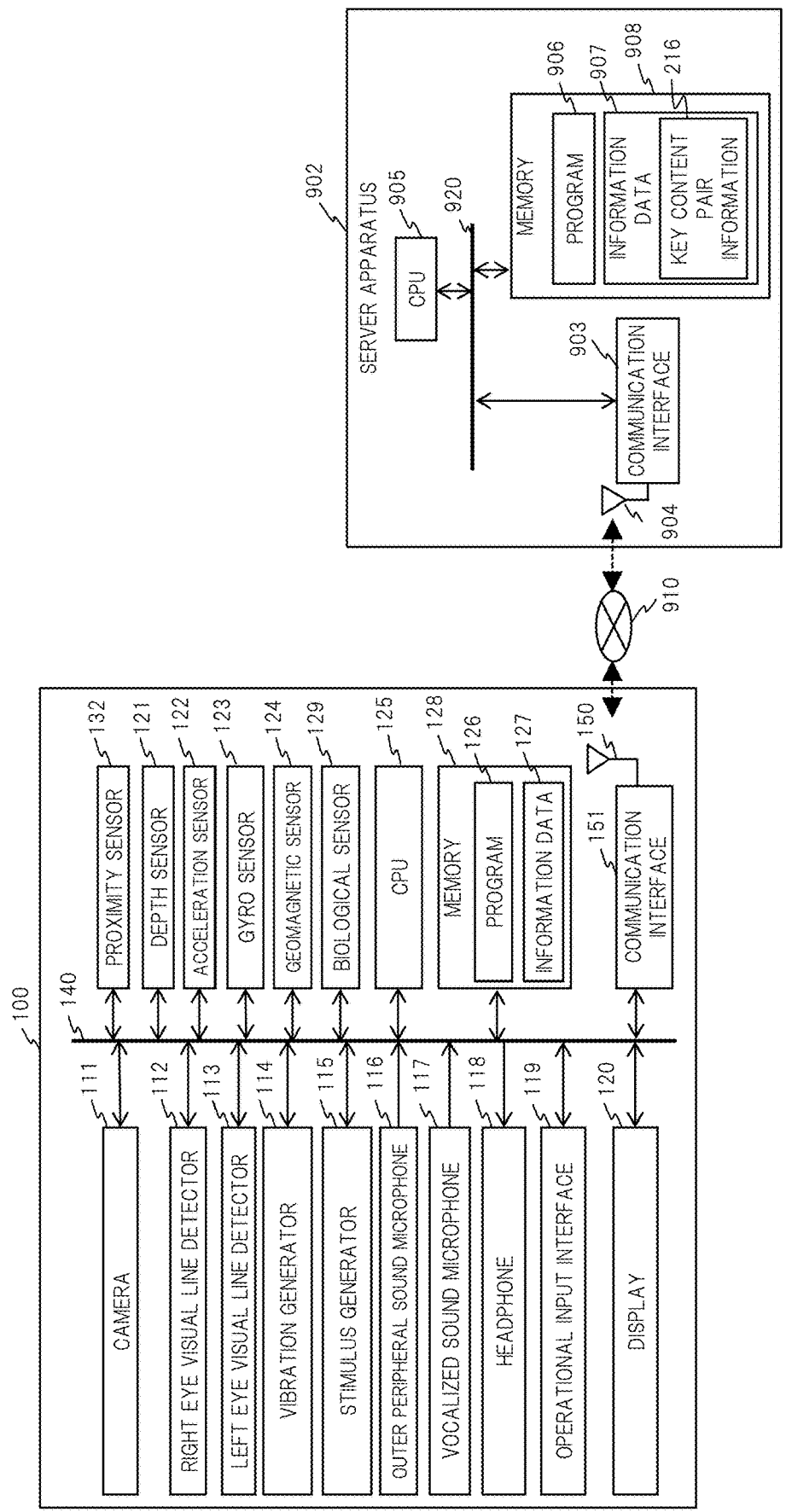

FIGS. 6(a), 6(b), and 6(c) are schematic diagrams each illustrating one example of a usage status of the head mounted processing apparatus, which corresponds to FIG. 5;

FIGS. 7(a), 7(b), and 7(c) are schematic diagrams each illustrating another example of the usage status of the head mounted processing apparatus, which corresponds to FIG. 5;

FIGS. 8(a) and 8(b) are schematic views illustrating another configuration example of the key content pair information in FIG. 2;

FIGS. 9(a) and 9(b) are views for explaining usage examples of a registration key by a user in FIG. 2;

FIG. 10(a) is a view for explaining another usage example of the registration key by the user in FIG. 2, and FIG. 10(b) is a schematic view illustrating a configuration example of the key content pair information, which corresponds to FIG. 9(a);

FIG. 11 is a view for explaining an operation example of the key content pair restorer illustrated in FIG. 2 in a head mounted processing apparatus according to a second embodiment of the present invention;

FIGS. 12(a), 12(b), 12(c), and 12(d) are views for explaining an operation example of the key content pair restorer illustrated in FIG. 2 in a head mounted processing apparatus according to a third embodiment of the present invention;

FIGS. 13(a), 13(b), 13(c), and 13(d) are views for explaining another operation example of the key content pair restorer illustrated in FIG. 2 in the head mounted processing apparatus according to the third embodiment of the present invention; and FIG. 14 is a block diagram illustrating a schematic configuration example around a head mounted processing apparatus according to a fifth embodiment of the present invention.

DETAILED DESCRIPTION OF EMBODIMENTS

Hereinafter, embodiments of the present invention will be described in detail with reference to the drawings. Note that in all drawings for explaining embodiments, the same reference numerals are respectively in principle applied to the same members, and repeated explanation thereof will be omitted.

First Embodiment

Outline of Head Mounted Processing Apparatus

Figure 1:
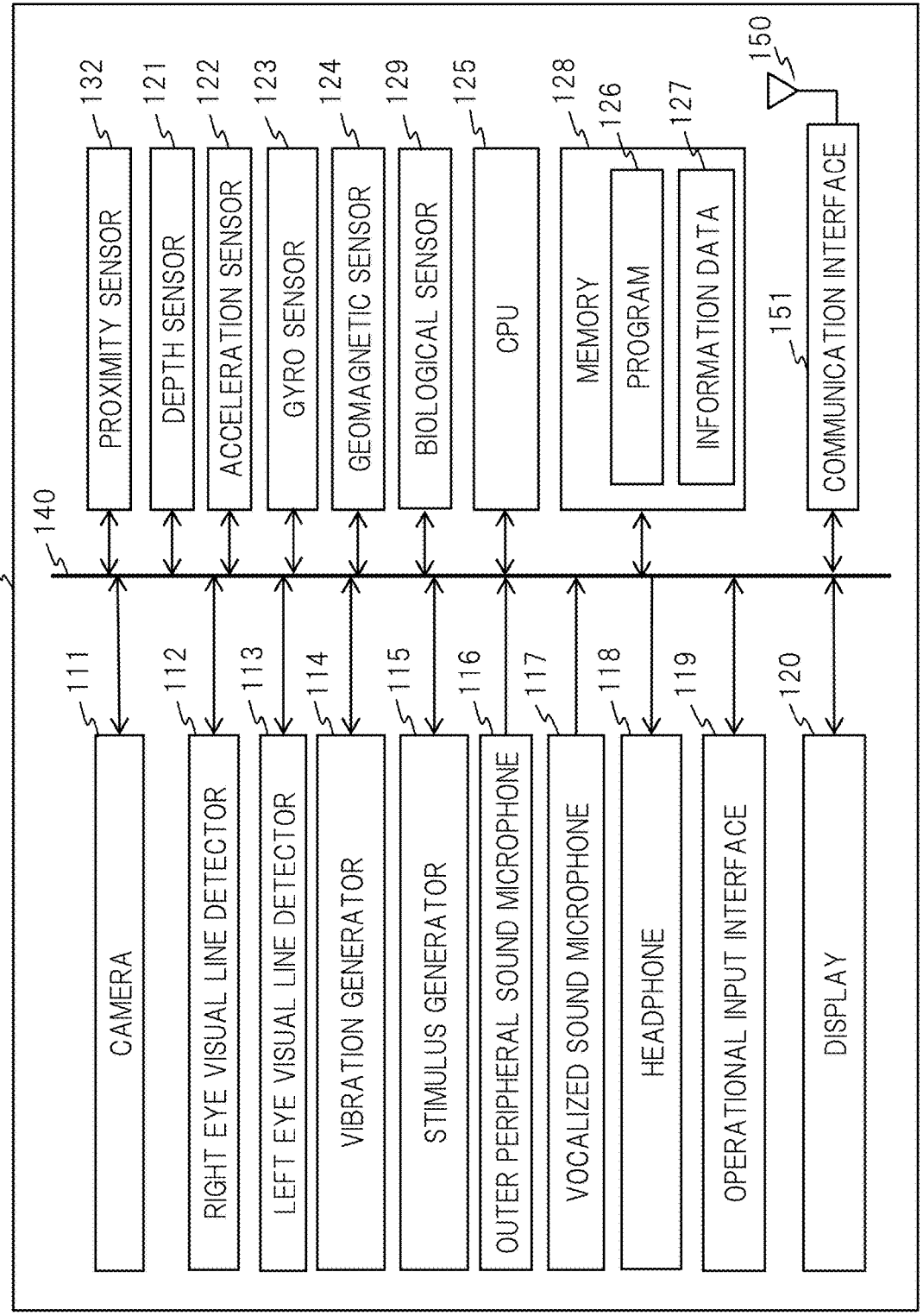
FIG. 1 is a block diagram illustrating a schematic configuration example of a head mounted processing apparatus according to a first embodiment of the present invention.

FIG. 1 is a block diagram illustrating a schematic configuration example of a head mounted processing apparatus according to a first embodiment of the present invention. A head mounted processing apparatus 100 illustrated in FIG. 1 provides various kinds of information to a user via a visual sense or an auditory sense in a state where it is worn on a head of the user. In the specification, the head mounted processing apparatus 100 is also referred to as an HMD 100. The HMD 100 includes a camera 111, an outer peripheral sound microphone 116, a vocalized sound microphone 117, a headphone 118, an operational input interface 119, a display (or a display unit) 120, a CPU (Central Processing Unit) 125, a memory 128, an antenna 150, and a communication interface 151.

Further, the HMD 100 also includes a vibration generator 114, a stimulus generator 115, and various kinds of sensors. The various kinds of sensors include a right eye visual line detector 112, a left eye visual line detector 113, a proximity sensor 132, a depth sensor 121, an acceleration sensor 122, a gyro sensor 123, a geomagnetic sensor 124, a biological sensor 129, and the like. These components are connected to each other via a bus 140.

The display (or the display unit) 120 is a liquid crystal panel or the like, for example, and is configured to display a predetermined image represented by an AR image or a VR image. The camera 111 is installed in front of both eyes of the user, for example, and is configured to capture an image outside the head mounted processing apparatus 100 (for example, a landscape in front of the user). The captured image is displayed on the display 120 as an image of a real space. The right eye visual line detector 112 and the left eye visual line detector 113 respectively detect visual lines of a right eye and a left eye. A technique of detecting the visual line of the user is generally known as eye tracking. For example, in eye tracking using corneal reflection, a face is irradiated with an infrared ray LED (Light Emitting Diode) to be photographed by an infrared camera, and a position of reflected light generated by the irradiation of the infrared ray LED on a cornea (corneal reflection) is used as a reference point to detect a visual line on the basis of a position of a pupil with respect to a position of the corneal reflection.

The vibration generator 114 is configured to generate vibration in response to an instruction from the CPU 125. For example, the vibration generator 114 converts notification information to the user generated by the CPU 125 into the vibration, thereby executing notification to the user with a higher degree of recognition. The stimulus generator 115 is configured to generate a predetermined stimulus represented by an electric stimulus, for example. The outer peripheral sound microphone 116 is worn in the vicinity of an ear of the user, for example, and is configured to collect ambient sound generated outside the apparatus to be converted into a voice signal. The vocalized sound microphone 117 is configured to collect vocalized voice from the user to be converted into a voice signal. The headphone 118 is configured to convert a voice signal inside the apparatus into voice (sound wave) to emit the sound to the user. The headphone 118 may be an air conduction sound type or a bone conduction sound (bone conduction) type.

The operational input interface 119 is typically a remote controller or the like, and is configured to receive various kinds of operational input signals by the user. The operational input interface 119 may be capable of receiving the various kinds of operational input signals via the communication interface 151. The proximity sensor 132 is configured to determine a distance to a target by determining the distance by a time when irradiated infrared rays are reflected by the target and returns thereto or using electromagnetic induction with the target or a change in capacitance with the target, for example, to detect a target close to the HMD 100. The depth sensor 121 is configured to measure a distance to an object in a plane. There are ones using reflection such as infrared rays or laser in the depth sensors 121, for example. However, the depth sensor 121 may be realized by another method such as a method of obtaining distance information from parallax of images photographed by a plurality of cameras that are respectively installed at different positions.

The acceleration sensor 122 is configured to detect motion, vibration, impact, and the like of the HMD 100 by detecting acceleration of the HMD 100. The gyro sensor 123 is configured to detect vertical, horizontal, or diagonal posture of the HMD 100 by detecting angular velocity in a rotational direction. The geomagnetic sensor 124 is configured to detect a direction in which the HMD 100 is facing by detecting magnetic force of the earth. Therefore, by using the gyro sensor 123 or the geomagnetic sensor 124, and in some cases, by using the acceleration sensor 122 together, it is possible to detect the posture of the HMD 100 (also, the user who wears it). The biological sensor 129 is configured to determine each user by detecting biological information of a corresponding user represented by the iris or the retina, for example.

The memory 128 is a flash memory, a RAM for a work, or the like, for example, and is configured to store a program 126 and various kinds of information data 127. The program 126 contains an OS (Operating System) and various kinds of programs for content, which runs on the OS. The information data 127 contain various kinds of parameters to be used by the program 126. The CPU 125 is configured to provide desired content to the user by executing the program 126 stored in the memory 128, and is also configured to control an operation of the entire HMD 100. The CPU 125 may include a processor dedicated to various arithmetic processes such as a GPU (Graphics Processing Unit).

The communication interface 151 is configured to execute short-range wireless communication via the antenna 150, for example. As examples of a method of the short-range wireless communication, there are an electronic tag, Bluetooth (registered trademark), IrDA (Infrared Data Association), Zigbee (registered trademark), HomeRF (Home Radio Frequency, registered trademark), and wireless LAN (IEEE802.11a, IEEE802.11b, IEEE802.11g), for example.

Details of Main Parts Around CPU

FIG. 2 is a block diagram illustrating a configuration example of main parts around the CPU in FIG. 1. In FIG. 2, the CPU 125 includes a content controller 205 and a content executor 206. The CPU 125 executes the program 126 stored in the memory 128, whereby the content controller 205 and the content executor 206 are implemented on the CPU 125. The content executor 206 executes various kinds of content in response to a request of the user or the like. The content controller 205 controls the content executor 206. Note that the content controller 205 and the content executor 206 are not limited to program processing (software) by the CPU 125, and may be implemented by hardware such as an FPGA (Field Programmable Gate Array) or various accelerators or a combination of hardware and software in some cases.

The content controller 205 includes a candidate key extractor 210, a key content pair information register 211, and a key content pair restorer 212. The candidate key extractor 210 extracts a candidate key on the basis of at least one of the images of the camera 111, the detection results of the various kinds of sensors 201, and received data of the communication interface 151. At this time, it is determined in advance which of the images of the camera 111, the detection results of the various kinds of sensors 201, and the received data of the communication interface 151 are used as the candidate keys by key setting information 215 in the memory 128. Note that the right eye visual line detector 112, the left eye visual line detector 113, the proximity sensor 132, the depth sensor 121, the acceleration sensor 122, the gyro sensor 123, the geomagnetic sensor 124, the biological sensor 129, and the like are included in the various kinds of sensors.

The key content pair information register 211 causes the candidate key extractor 210 to extract candidate keys when an event occurs, and determines a key at the time of the event occurrence from the example, the candidate keys correspond to a single object or a plurality of objects included in the camera image, for example. The key content pair information register 211 determines one object of the single object or the plurality of objects (one key of a single candidate key or a plurality of candidate keys) as the key at the time of the event occurrence.

Then, the key content pair information register 211 associates a state of content in the content executor 206 at the time of the event occurrence with the key at the time of the event occurrence, and stores them in the memory 128 as key content pair information 216. In the specification, this key at the time of the event occurrence determined by the key content pair information register 211 and stored as the key content pair information 216 is called a registration key. The time when an event occurs means a time when the apparatus is terminated that is a time when an apparatus termination signal (for example, a power off signal or the like) POFF is received, or a time when a predetermined instruction from the user is received via a user input signal CMD.

On the other hand, at a time of apparatus activation that is a time when an apparatus activation signal (for example, a power on signal or the like) PON is received, the key content pair restorer 212 causes the candidate key extractor 210 to extract candidate keys. Then, the key content pair restorer 212 determines, on the basis of the key content pair information 216, whether each of the extracted candidate keys is made conformity with the registration key or not, and restores a state of the content corresponding to the registration key in a case where they are made conformity with each other.

Here, as the time of the apparatus termination of the HMD 100, (A) a time when the user removes the HMD 100 from his or her head, (B) a time when the power is turned off in a state where the user wears the HMD 100 on the head, (C) a time when the power is turned off after the user removes the HMD 100 from the head and place the HMD 100 anywhere are typically cited. The power off does not necessarily mean shutting of the power, but may also mean shifting to a sleep mode. (A) is detected by using a proximity sensor provided on a face side of the HMD 100, for example. In a case where the HMD 100 is removed from the head, depending upon the HMD 100, the power may automatically be turned off, or may automatically shift to the sleep mode. Unlike the case of (A), (C) targets an HMD 100 that does not turn off automatically (or does not shift to a sleep mode).

For example, the user input signal CMD is issued in accordance with an interruption button on a remote controller or the like, or an interruption instruction via a menu on a screen, and plays a role of a bookmark, a bookmarker, a restoration point, or the like. Further, the state of the content indicates a type of content, or an execution state on the content in addition to the type of the content. For example, the type of the content is information that distinguishes operation reproducing content such as movies, game content such as role playing, experience content such as sightseeing, document creating content, chat room content, and the like. In this case, the key content pair information register 211 may store a file path to the content as the state of the content in the key content pair information 216, for example. The key content pair restorer 212 may activate the content on the basis of the file path or the like.

On the other hand, the execution state on the content indicates, for example, a reproduction portion on operation reproducing content, a progress portion on game content or experience content, a document file name on document creating content, environment of participants in a chat room content, and the like. In this case, the key content pair information register 211 may appropriately store, for example, the file path to the content, a file path to each of various setting files, a file path to a document file, or parameter values of the CPU (such as a register value and a counter value) as the state of the content in the key content pair information 216. The key content pair restorer 212 may restore the execution state on the content in addition to activation of the content on the basis of the various kinds of information thus stored.

Details of Key Content Pair Information Register and Key Content Pair Restorer

Figure 3:
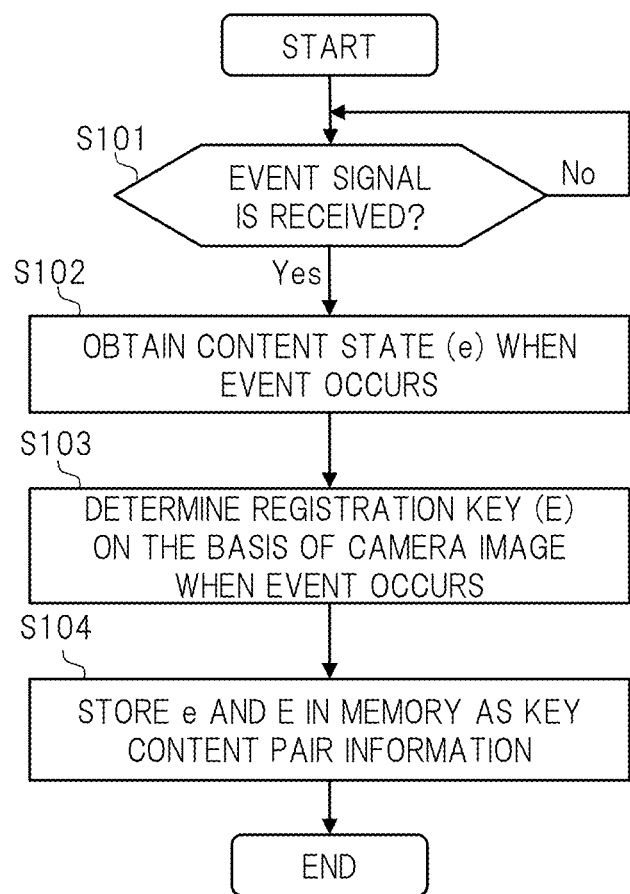
FIG. 3 is a flow diagram illustrating an operation example of a key content pair information register illustrated in FIG. 2.
Figure 4:
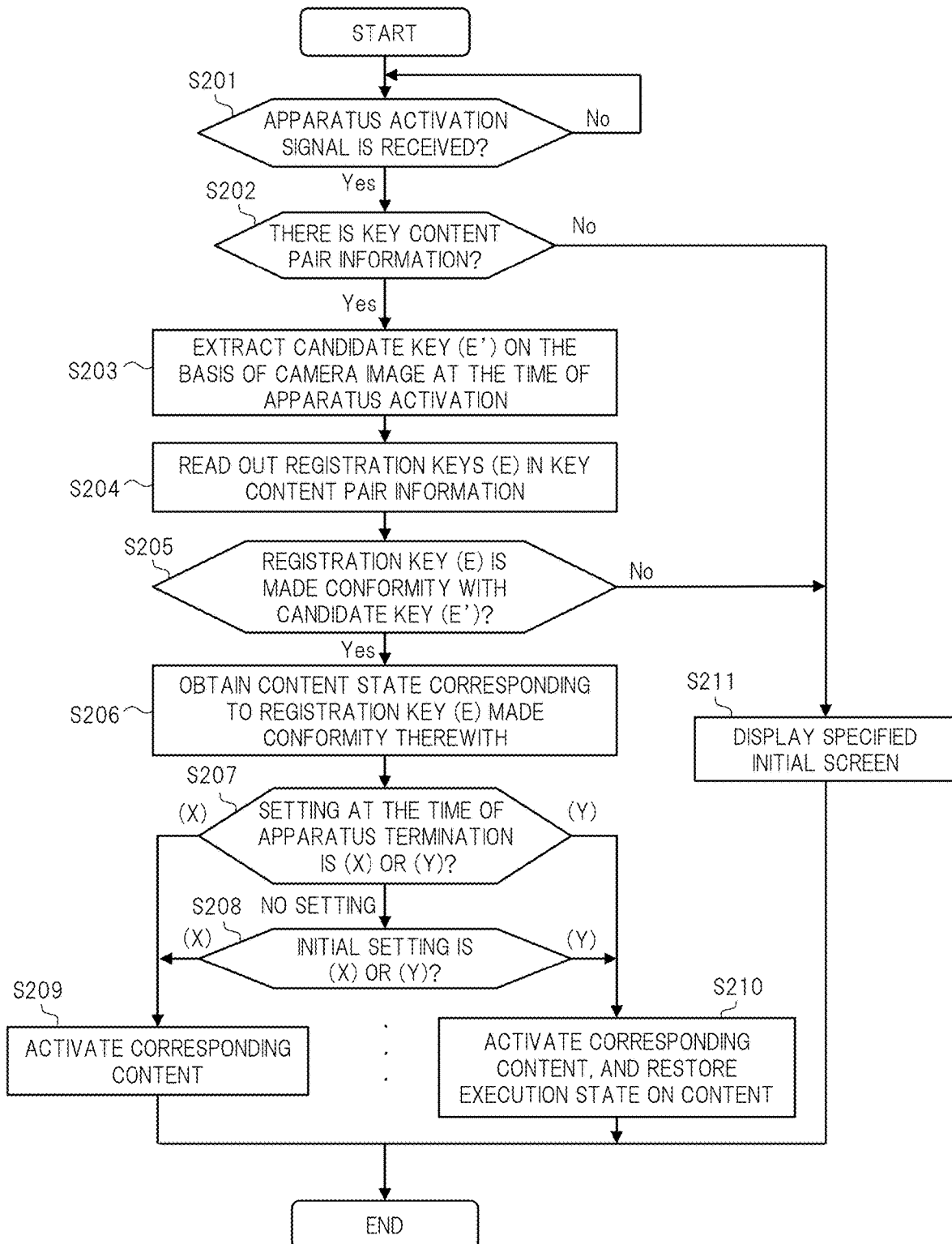
FIG. 4 is a flow diagram illustrating an operation example of a key content pair restorer illustrated in FIG. 2.

FIG. 3 is a flow diagram illustrating an operation example of the key content pair information register illustrated in FIG. 2. FIG. 4 is a flow diagram illustrating an operation example of the key content pair restorer illustrated in FIG. 2. Here, a case where keys (the candidate key and the registration key) are the images of the camera 111 will be described as an example. In FIG. 3, when an event signal (the apparatus termination signal POFF or the user input signal CMD) is received (Step S101), the key content pair information register 211 executes a process at Step S102. At Step S102, the key content pair information register 211 obtains, from the content executor 206, a state (e) of content when an event occurs.

Subsequently, the key content pair information register 211 causes the candidate key extractor 210 to extract candidate keys on the basis of images of the camera 111 at the time of the event occurrence, and to determine a registration key (E) from the candidate keys (Step S103). Subsequently, the key content pair information register 211 associates the state (e) of the content obtained at Step with the registration key (E) determined at Step S103; stores it in the memory 128 as key content pair information 216 (Step S104); and terminates the processes.

On the other hand, in FIG. 4, when an apparatus activation signal is received (Step S201), the key content pair restorer 212 executes a process at Step S202. At Step S202, the key content pair restorer 212 determines whether the key content pair information 216 is stored in the memory 128 or not. In a case where it is determined that the key content pair information 216 is not stored, the key content pair restorer 212 causes the display 120 to display a specified initial screen after apparatus activation (for example, a menu screen or the like) (Step S211), and terminates the processes.

On the other hand, in a case where it is determined at Step S202 that the key content pair information 216 is stored, the key content pair restorer 212 causes the candidate key extractor 210 to extract a candidate key (E') on the basis of the images of the camera 111 at the time of the apparatus activation (Step S203). Subsequently, the key content pair restorer 212 in turn reads out registration keys (E) in the key content pair information 216 from the memory 128 (Step S204), and determines whether the read registration key (E) is made conformity with the candidate key (E') extracted at Step S203 (in other words, camera image) or not (Step S205).

In a case where it is determined at Step S205 that they are not made conformity with each other, the key content pair restorer 212 causes the display 120 to display the specified initial screen at Step S211, and terminates the processes. On the other hand, in a case where it is determined at Step S205 that they are made conformity with each other, the key content pair restorer 212 obtains a state of the content corresponding to the registration key (E) made conformity with the candidate key (E') on the basis of the key content pair information 216 (Step S206). Then, the key content pair restorer 212 activates the corresponding content (Step S209) or additionally restores an execution state on the content (Step S210) on the basis of a setting at the time of apparatus termination or an initial setting (Step S207, S208), and terminates the processes.

In this example, it becomes possible to cause the user to arbitrarily select whether the type of the content as mentioned in the description of FIG. 2 is to be restored or the execution state on the content is to be restored at the time of the apparatus termination (Step S207), or to fixedly determine this by the initial setting of each content (Step S208). The information at the time of the apparatus termination or the information at the time of the initial setting is stored in the memory 128. For example, in case of moving image reproducing content, it becomes possible for the user to arbitrarily select whether a moving image is to be reproduced from the beginning thereof or from an interruption portion at the time of the apparatus termination, and it also becomes possible to fixedly determine this in accordance with the initial setting thereof. Note that this determining method is not particularly limited to a user setting at the time of the apparatus termination or the initial setting, and various methods can be used.

FIG. 5 is a schematic view illustrating a configuration example of the key content pair information illustrated in FIG. 2. FIG. 6(a), FIG. 6(b), and FIG. 6(c) are schematic diagrams each illustrating one example of a usage status of the head mounted processing apparatus, which corresponds to FIG. 5. FIG. 7(a), FIG. 7(b) and FIG. 7(c) are schematic diagrams each illustrating another example of the usage status of the head mounted processing apparatus, which corresponds to FIG. 5.

In FIG. 6(a), a user 601 who wears the HMD 100 views or enjoys a movie "mountain climbing" using moving image reproducing content 604 of the HMD 100 as illustrated in FIG. 6(c), and instructs apparatus termination to the HMD 100 (for example, turns off the power) while facing a direction of a clock 602 at a reproduction time "1:10:15" that is in the middle of the reproduction. At this time, as illustrated in FIG. 6(b), the camera 111 captures the clock 602. On the other hand, in FIG. 7(a), the user 601 who wears the HMD 100 carries out document creation by using document creating content 605 of the HMD 100, and instructs the apparatus termination to the HMD 100 while facing a direction of a calendar 603 after a document file thereof is saved. At this time, as illustrated in FIG. 7(b), the camera 111 captures the calendar 603.

As a result, a key content pair information 216a illustrated in FIG. 5 stores the reproduction time "1:10:15" in the movie "mountain climbing", which is the state of the content (the execution state on the content) so as to be associated with the clock 602, which is the registration key. Further, the key content pair information 216a illustrated in FIG. 5 stores the document file on the document creating content 605, which is the state of the content (the execution state on the content) so as to be associated with the calendar 603, which is the registration key.

As a result, when the user 601 then wears the HMD 100 and instructs apparatus activation (for example, the power is turned on) while facing the direction of the clock 602, the HMD 100 automatically reproduces the movie "mountain climbing" from the reproduction time "1:10:15". As a result, the user 601 can resume viewing the movie from continuation of the previous time without carrying out a selection operation particularly. Further, when the user 601 wears the HMD 100 and instructs the apparatus activation while facing the direction of the calendar 603, the HMD 100 automatically activates a predetermined document file on the document creating content 605. As a result, the user 601 can resume document creation from continuation of the previous time without carrying out a selection operation particularly.

Here, for the sake of simplification of the explanation, the clock 602 and the calendar 603 have been determined as the registration key. However, in practice, for example, a sofa provided in a living room or a bookshelf provided in a study may be determined as a registration key. As a concrete usage example, it is assumed a case where a user views a movie in the middle thereof in a living room using the HMD 100 and then carries out document creation in the middle thereof in a study using the HMD 100. In this case, in a case where the user activates the HMD 100 while viewing a sofa in the living room, the continuation of the movie is reproduced automatically. In a case where the user activates the HMD 100 while viewing a bookshelf in the study, environment in which the continuation of the document creation can be carried out is constructed automatically.

Figure 6:
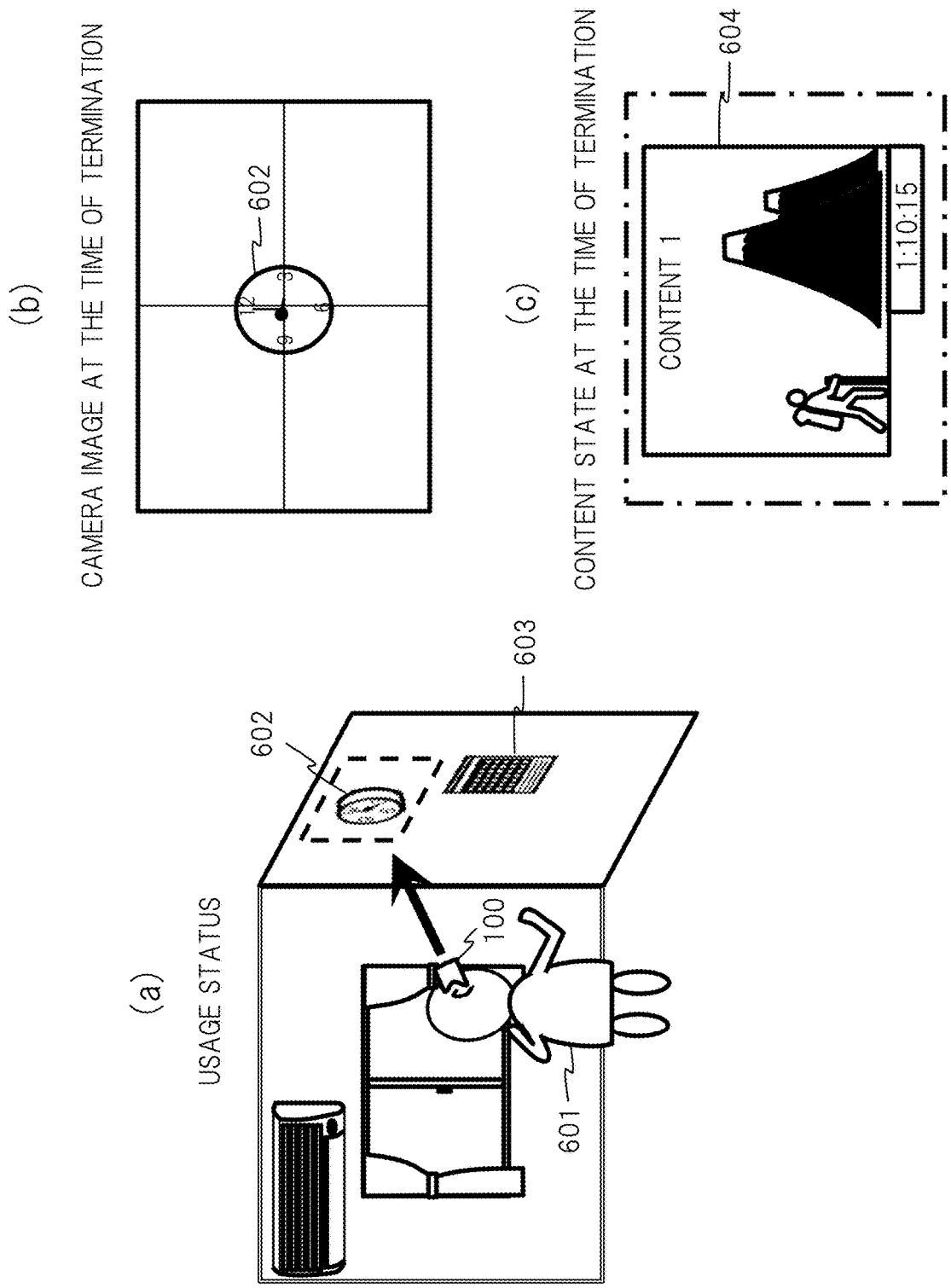
Figure 7:
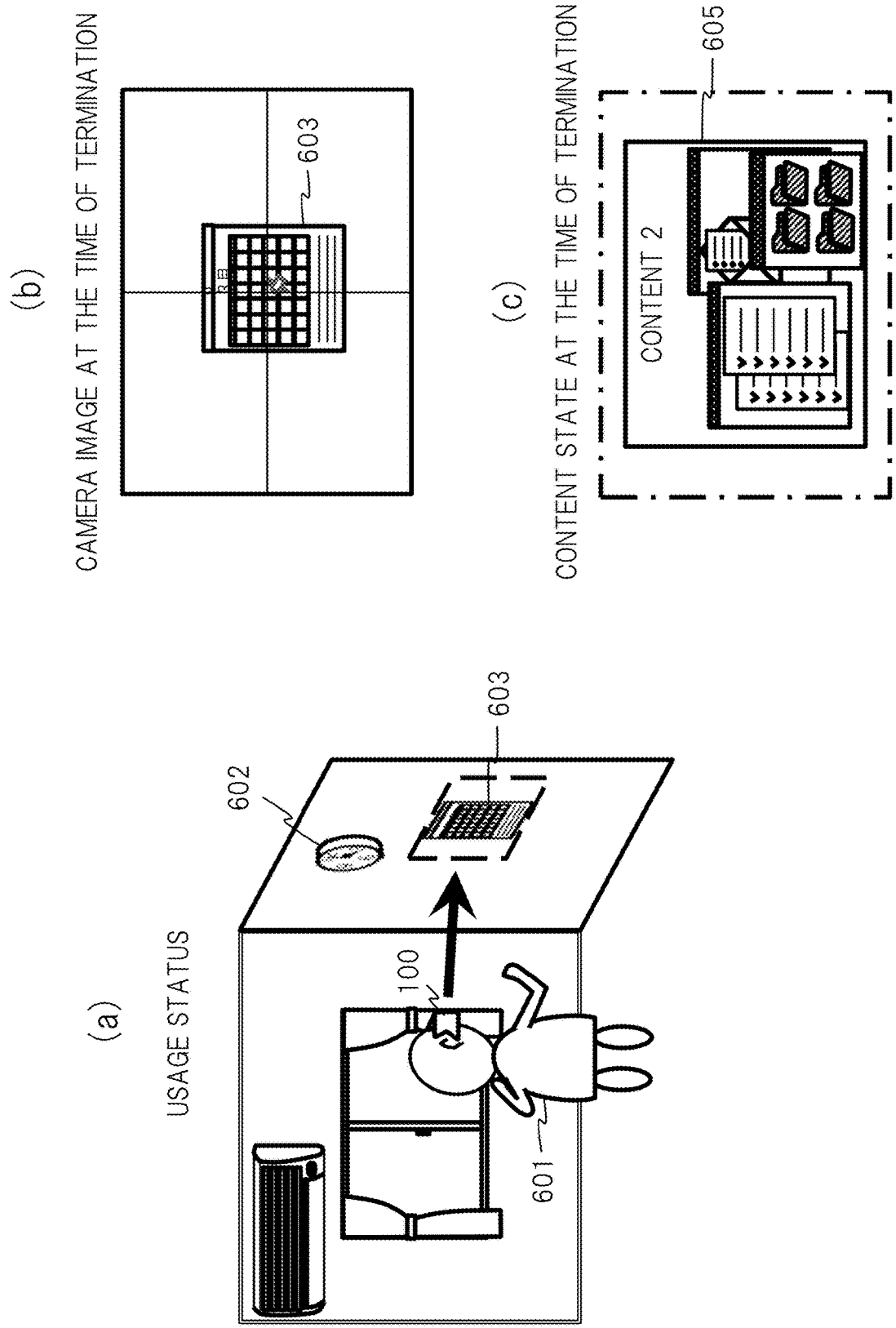

Here, as the registration key determined by the key content pair information register 211, for example, a method of using the entire image of the camera 111 as it is or a method of detecting and using one object included in a central portion of the image of the camera 111 are cited. In the examples of FIG. 5, FIG. 6, and FIG. 7 described above, the latter method is used. In case of the latter method, the key content pair information register 211 causes the candidate key extractor 210 to extract a single object or a plurality of objects from the entire camera image at the time of the apparatus termination as the candidate key, for example. The key content pair information register 211 then determines one object included in the central portion of the camera image from the extracted single object or the plurality of extracted objects (the candidate key) as the registration key, and stores the one object as the key content pair information 216.

At this time, the candidate key extractor 210 executes image processing represented by edge detection or corner detection or image processing using artificial intelligence (AI), thereby extracting information on a single object or a plurality of objects included in the entire camera image (for example, its shape, a type, a feature point, or the like). Information on one object among information on the extracted single object or the plurality of extracted objects (the shape, the type, the feature point, or the like) serves as a registration key. Further, in case of the latter method, the key content pair restorer 212 causes the candidate key extractor 210 to extract a single candidate key or a plurality of candidate keys (in this example, information on objects) from the entire camera image at the time of the apparatus activation, for example. Then, in a case where the registration key is included in the extracted single candidate key or the plurality of extracted candidate keys (in other words, the camera image), for example, the key content pair restorer 212 determines that they are made conformity with each other. In a case where the registration key is not included therein, the key content pair restorer 212 determines that they are not made conformity with each other.

On the other hand, in case of the former method, for example, the key content pair restorer 212 compares the entire camera image stored as the registration key with the entire camera image captured at the time of the apparatus activation (in other words, one candidate key), and determines whether the candidate key is made conformity with the registration key or not depending upon whether a matching rate is equal to or higher than a reference value or not. In this case, although the processing can be facilitated, there is a fear that accuracy of a determination result of whether they are made conformity with each other or not is lowered due to an influence of a scale of the camera image particularly. Therefore, it is desirable to use the latter method from the viewpoint of the accuracy of the determination result of whether they are made conformity with each other or not.

Various Modification Examples of Key

FIG. 8(*a*) and FIG. 8(*b*) are schematic views illustrating another configuration example of the key content pair information in FIG. 2. FIG. 8(*a*) illustrates an example in which detection results of the various kinds of sensors 201 illustrated in FIG. 2 are used as registration keys instead of the image of the camera 111. FIG. 8(*b*) illustrates an example in which a combination of the image of the camera 111 and the detection results of the various kinds of sensors 201 are used as the registration keys.

In key content pair information 216*b* illustrated in FIG. 8(*a*), using an HMD 100 capable of power on/off in a state where the HMD 100 is removed from the head as an example, the registration key is set to posture of the HMD 100 (for example, inside out, installation at a lower right, or the like) on the basis of the key setting information 215 illustrated in FIG. 2. For example, when the user turns on the HMD 100 in a state where the HMD 100 is turned inside out, the HMD 100 reproduces the movie "mountain climbing" automatically. The posture of the HMD 100 is detected by the gyro sensor 123, the geomagnetic sensor 124, and the like, for example, and a sensor output value and the like that are their detection results serve as keys (a candidate key and a registration key).

In key content pair information 216*c* illustrated in FIG. 8(*b*), the registration key is set to a combination of the posture of the HMD 100 (for example, inside out) and a camera image (for example, a clock). For example, when the user turns the HMD 100 inside out and turns on the HMD 100 while causing the direction of the camera 111 to face the clock in this state, the HMD 100 reproduces the movie "mountain climbing" automatically. On the other hand, when the user turns the HMD 100 downward and to the right side and turns on the HMD 100 while causing the direction of the camera 111 to face the clock in this state, the HMD 100 activates a document file automatically. By using the combination of the camera image and the sensor detection result in this manner, it becomes possible to increase the number of registration keys that can be used, or to heighten certainty (or accuracy) of determining whether the key is made conformity therewith.

FIG. 9(*a*) and FIG. 9(*b*) are views for explaining usage examples of the registration key by the user in FIG. 2. In particular, in a case where the user 601 uses the VR content on the HMD 100, the entire actual field of view is blocked. Thus, it may be difficult to make an impression of where the user was facing when the HMD 100 is removed. Therefore, for example, by using a direction of a wall that the user 601 was facing at the time of apparatus termination as a registration key, it is possible to expand an effective range of the registration key.

In the examples illustrated in FIG. 9(*a*) and FIG. 9(*b*), any one of four walls in a room is determined as the registration key. This makes it for the user 601 to determine the registration key by removing the HMD 100 in a state where the user 601 roughly faces any one of the four walls without worrying about the fine direction and storing the direction of the wall. As a result, the user 601 can easily handle the registration key. Further, by subdividing each of the four walls into an upper half, a lower half, and the like, it is possible to increase the number of keys while maintaining ease of handling.

Note that in a case where such a method is used, the registration key is determined on the basis of a sensor output value that is a detection result of the geomagnetic sensor 124 or the like, for example. However, in this case, the registration key has a certain effective range so that a range from northeast to northwest (that is, a predetermined sensor output value range) is set for a wall V and a range from northwest to southwest is set for a wall W, for example. When a sensor output value (that is, a candidate key) is obtained via the candidate key extractor 210 at the time of apparatus activation, it is determined whether this sensor output value (the candidate key) is made conformity with the sensor output value range (the registration key) or not. In a case where the sensor output value range (the registration key) includes the sensor output value (the candidate key), it is determined that the sensor output value is made conformity with the sensor output value range (the registration key).

FIG. 10(a) is a view for explaining another usage example of the registration key by the user in FIG. 2. FIG. 10(b) is a schematic view illustrating a configuration example of the key content pair information, which corresponds to FIG. 10(a). In the examples illustrated in FIG. 10(a) and FIG. 10(b), received data by the communication interface 151 illustrated in FIG. 2 are used as a registration key instead of the camera image. Specifically, the received data are identification information of a beacon, for example. As described above, the communication interface 151 executes short-range wireless communication.

In general, an apparatus that executes the short-range wireless communication periodically outputs a beacon containing identification information of its own apparatus. For example, an access point apparatus for wireless LAN periodically outputs an SSID (Service Set IDentifier) as identification information of a beacon. Therefore, by receiving identification information of a beacon via the communication interface 151, the HMD 100 can determine the registration key using the identification information of the beacon.

In FIG. 10(a), the user 601 uses the HMD 100 to execute content A within a reception area of SSID #1 from an access point apparatus 1001, and instructs apparatus termination to the HMD 100 in the middle thereof. Then, the user 601 moves to another place, uses the HMD 100 to execute content B within a reception area of SSID #2 from an access point apparatus 1002, and instructs apparatus termination to the HMD 100 in the middle thereof.

As a result, key content pair information 216d of FIG. 10(b) contains a correspondence relationship between the content A and the SSID #1 as the registration key and a correspondence relationship between the content B and the SSID #2 as the registration key. Then, when the user 601 activates the HMD 100 within the reception area of the SSID #1, the key content pair restorer 212 determines whether a candidate key extracted by the candidate key extractor 210 (here, received data "SSID #1" by the communication interface 151) is made conformity with the registration key stored as illustrated in FIG. 10(b) or not. In this case, since the registration key "SSID #1" is made conformity with the candidate key, the key content pair restorer 212 activates the corresponding content A automatically. Similarly, when the user 601 activates the HMD 100 within the reception area of the SSID #2, the key content pair restorer 212 activates the content B automatically.

Thus, in a case where different beacon transmitters (in the example of FIG. 10(a), the access point apparatus) are installed for respective places, the user 601 can restore a state of different content depending upon the place where the HMD 100 is activated. As the unit of the place, a room unit, a building unit, a district unit, and the like are cited, for example. Further, in addition to the case where beacon transmitters are installed for places in this manner, it is also possible to apply to a case where the user himself or herself carries the beacon transmitter. In this case, in a case where a user who possesses a beacon transmitter terminates an HMD in a state of certain content and the same or a different user who possesses the same beacon transmitter then activates the HMD, the state of the content at the time of termination is restored.

Further, the received data by the communication interface 151 has been used as the registration key herein, but in some cases, it is possible to combine the image of the camera 111 or the detection results of the various kinds of sensors 201 with it. For example, in a case where the image of the camera 111 is combined with it, it is possible to distinguish registration keys by identification information of a beacon even though rooms have the same interior but the rooms are different from each other. In addition, it is possible to distinguish the registration keys for each room by the image of the camera 111.

As another usage example of the registration keys, a method in which a user instructs apparatus termination to an HMD in a state where a package of content to be reproduced is captured by a camera, and next time, the user instructs apparatus activation to the HMD in a state where the package can be captured by the camera is cited. Further, a method of setting a position of a visual line detected by the right eye visual line detector 112 and the left eye visual line detector 113 as a registration key is cited. For example, in a case where a user instructs apparatus termination to an HMD in a state where the user views an upper right corner of a screen while reproducing predetermined content, it is possible to reproduce the predetermined content automatically by instructing the HMD to apparatus activation next time in a state where the user is viewing the upper right corner of the screen. Moreover, in a case where the HMD 100 includes a GPS receiver, it is possible to determine GPS information as a registration key.

Handling In Case Where HMD is Used by Plural Users

In a case where the HMD 100 is used by a plurality of users, it is possible to determine registration keys for the respective users independently, for example, by using a combination of the image of the camera 111 and the detection results of the various kinds of sensors 201 as a registration key. Specifically, for example, the biological sensor 129 for detecting biological information of a user represented by an iris, a retina, or the like may be used as the various kinds of sensors 201. Further, in some cases, it is possible to distinguish the users from a pattern of blood flow, a pulse wave, or the like obtained by the biological sensor 129, or it is also possible to distinguish the users by a personal habit at the time of wearing the HMD, which can be detected by the acceleration sensor 122 or the gyro sensor 123.

Main Effect of First Embodiment

As described above, by using the head mounted processing apparatus (HMD) according to the first embodiment, it becomes possible to typically improve convenience of the user(s). Specifically, the user can successively use the HMD from the state at the time of previous termination without time and effort of any selection operation by the remote controller or the like. Further, at this time, the HMD does not take over the state at the time of the previous termination as it is, for example, taking over document creation after movie viewing and the document creation, but can take over the state at the time of the previous termination while distinguishing the content by the registration key, for example, taking over movie viewing after the movie viewing and document creation. Moreover, since the user can take over the state at the time of the previous termination without carrying out an extra operation such as a selection operation, it becomes possible to maintain a sense of immersion on the content.

Second Embodiment

Handling In Case Where Desired Content is Not Activated

FIG. 11 is a view for explaining an operation example of the key content pair restorer illustrated in FIG. 2 in a head mounted processing apparatus according to a second embodiment of the present invention. In the first embodiment described above, it is assumed that the desired content is activated in a case where the registration key is made conformity therewith. However, in some cases, incorrect content may be activated depending upon accuracy of determining whether the key is made conformity therewith or misunderstanding of the registration key by the user. Therefore, a key content pair restorer 212 restores a state of content, and then determines whether a cancellation instruction is received from a user within a predetermined period of time or not. In a case where a cancellation instruction is received, the key content pair restorer 212 terminates the current content, and causes a display (or a display unit) 120 display a specified initial screen after apparatus activation.

In the example illustrated in FIG. 11, at the time of the apparatus activation, an HMD 100 activates content 2 in a state where a user 601 is expected to activate content 1. Therefore, the user 601 issues a cancellation instruction within a predetermined period of time thereafter, for example, by shaking his or her head. The key content pair restorer 212 receives this cancellation instruction, and causes the display (or the display unit) 120 to display a specified initial screen after apparatus activation (for example, a menu screen or the like). Note that a motion of shaking the head is detected by a gyro sensor 123.

Of course, the method of the cancellation instruction is not limited to this. For example, various methods including a cancel button of a remote controller can be used. Further, the key content pair restorer 212 causes the display to display the specified initial screen herein. However, in some cases, a method of reproducing contents registered in key content pair information 216 in turn and determining whether there is a cancellation instruction by a user each time may be used.

Main Effect of Second Embodiment

As described above, by using the head mounted processing apparatus (HMD) according to the second embodiment, in addition to the various effects described in the first embodiment, it is possible to handle a case where incorrect content is activated, and this makes it possible to improve convenience of the user.

Third Embodiment

Handling In Case Where Plural Registration Keys are Conformity Therewith

FIG. 12(a), FIG. 12(b), FIG. 12(c), and FIG. 12(d) are views for explaining an operation example of the key content pair restorer illustrated in FIG. 2 in a head mounted processing apparatus according to a third embodiment of the present invention. Here, it is assumed a case where the key content pair information 216a as illustrated in FIG. 5 is stored in a memory 128. In FIG. 12(a) and FIG. 12(b), a user 601 who wears an HMD 100 instructs apparatus activation to the HMD 100 in a state where both a clock 602 and a calendar 603 are captured by a camera 111.

In this case, a key content pair restorer 212 uses a candidate key extractor 210 to extract both objects of the clock 602 and the calendar 603 as candidate keys. As illustrated in FIG. 5 as the key content pair information 216a, the both candidate keys are stored in the memory 128 as registration keys. In a case where a plurality of registration keys is included in an image of the camera 111 at the time of apparatus activation in this manner, as illustrated in FIG. 12(c) or FIG. 12(d), the key content pair restorer 212 causes a display (or a display unit) 120 to display a selection screen for content. This selection screen is a screen for causing a user to select any one of a plurality of states of contents corresponding to the plurality of registration keys, and is a screen for displaying thumbnails of the respective contents, for example.

As a result, even in a case where positional deviation or scale deviation between a camera image at the time of apparatus termination and a camera image at the time of apparatus activation occurs to an extent, the user 601 can activate desired content surely. Note that as a method of selection by the user on the selection screen, in addition to a method of carrying out an operation by a remote controller or the like, for example, a method of directing a head or the line of sight for a specified time, and a method of pressing a determination button on the remote controller while directing the head or the line of sight are cited. A direction of the head or the line of sight is detected by a gyro sensor 123, a geomagnetic sensor 124, or each visual line detector (112, 113).

Figure 12:
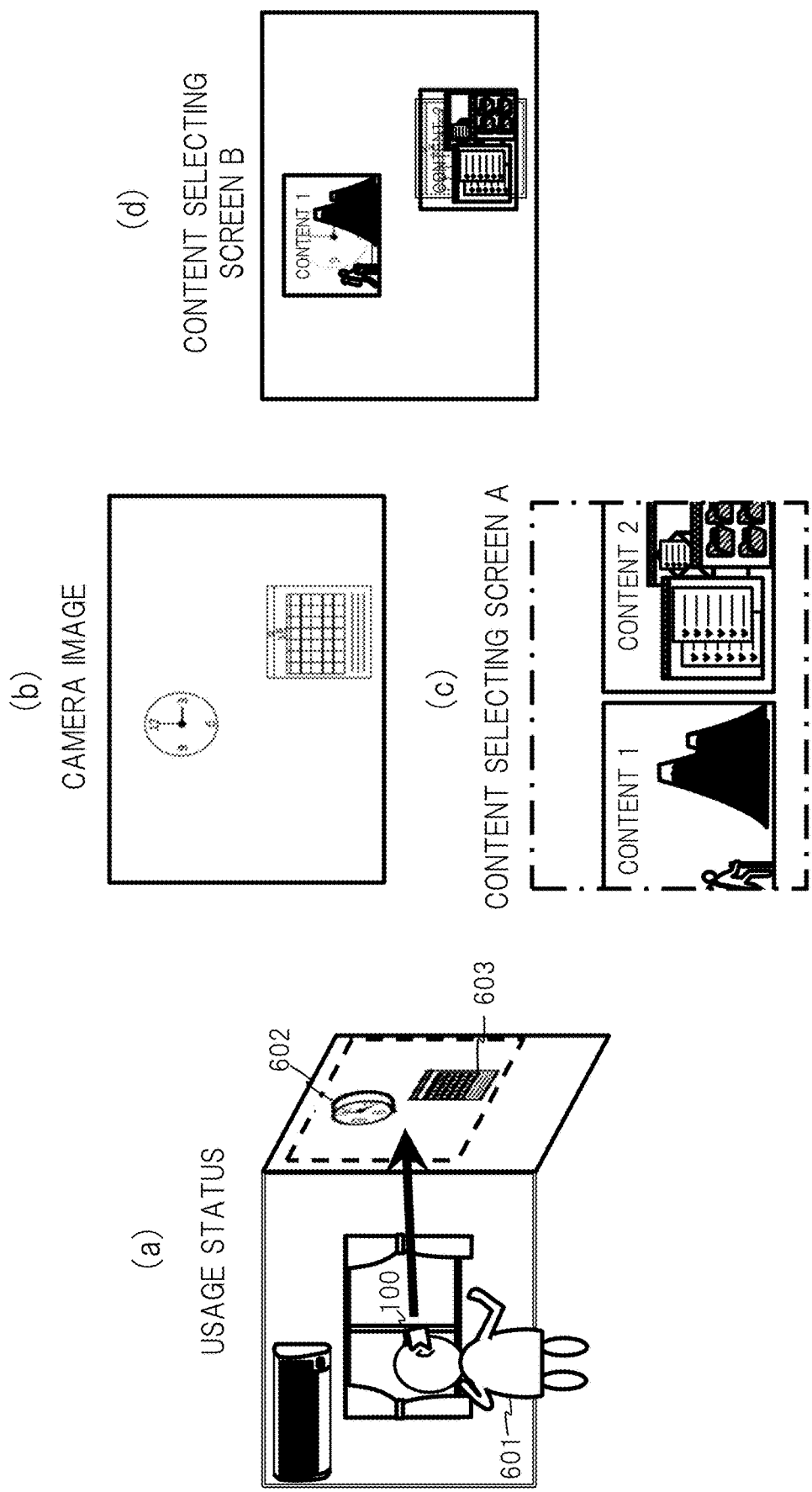

Further, depending upon the method of FIG. 12, it becomes possible to handle a case where the user 601 does not clearly remember a registration key. Specifically, for example, in a case where any selection operation by the user 601 is not carried out on the selection screen, the key content pair restorer 212 in turn determines whether each camera image is made conformity with the registration key or not in conjunction with an operation of looking around the surroundings by the user 601 (also, a change in the camera image). Then, the key content pair restorer 212 sequentially displays selection screens as illustrated in FIG. 12(d) for each camera image. Note that in some cases, for example, content is not activated automatically at the time of apparatus activation by using the method of FIG. 12, but a method of always displaying the selection screens as illustrated in FIG. 12(d) to cause a user to select any one may be used.

FIG. 13(a), FIG. 13(b), FIG. 13(c), and FIG. 13(d) are views for explaining another operation example of the key content pair restorer illustrated in FIG. 2 in the head mounted processing apparatus according to the third embodiment of the present invention. In FIG. 13(c) and FIG. 13(d), unless the cases of FIG. 12(c) and FIG. 12(d), thumbnails of the respective contents on the selection screen are weighted.

Specifically, the key content pair restorer 212 gives a large weight to a registration key that is located near a central portion of the image of the camera 111 at the time of the apparatus activation, and displays the selection screen in which the weighting is made. As a weighting method, a method of largely displaying a corresponding thumbnail as a registration key has a larger weight as illustrated in FIG. 13(c), and a method of displaying a thumbnail corresponding to a registration key that has a larger weight in the front of a screen as illustrated in FIG. 13(d) are cited.

Main Effect of Third Embodiment

As described above, by using the head mounted processing apparatus (HMD) according to the third embodiment, in addition to the various effects described in the first embodiment, it is possible to handle a case where a plurality of registration keys is made conformity therewith, and this makes it possible to improve convenience of the user. Further, since the user can determine objects that are close to each other as a registration key, it is possible to relax restrictions on determining a registration key, and this makes it possible to improve convenience of the user.

Fourth Embodiment

Memory Assistance of Registration Key

In particular, in a case where an HMD 100 for non-transparent VR is used, it may be difficult for a user to remember which direction the user faces at a time of apparatus termination (in other words, a capturing direction of a camera 111). Therefore, the key content pair information register 211 illustrated in FIG. 2 may cause a display 120 to display an image of the camera 111 for a certain period of time at the time of the apparatus termination. This makes it possible for the user to memorize a registration key in a vivid manner.

Specifically, for example, the key content pair information register 211 causes the display 120 to display an image by a content executor 206 and the image of the camera 111 in succession in a short period of time, for example, displaying both images several times alternately. This makes it possible for the user to have a strong impression on relevance of the both images, and it is possible to memorize the registration key more clearly. Further, at this time, the user can select an object to be determined as a registration key clearly by moving his or her head after the image of the camera 111 is displayed on the display 120.

Main Effect of Fourth Embodiment

As described above, by using the head mounted processing apparatus (HMD) according to the fourth embodiment, in addition to the various effects described in the first embodiment, it becomes possible to assist the user in memorizing the registration key, and this makes it possible to improve convenience of the user.

Fifth Embodiment

Outline of Head Mounted Processing Apparatus

FIG. 14 is a block diagram illustrating a schematic configuration example around a head mounted processing apparatus according to a fifth embodiment of the present invention. FIG. 14 illustrates a server apparatus 902 connected to a head mounted processing apparatus (HMD) 100 as illustrated in FIG. 1 via a communication network 910 in addition to the HMD 100. The server apparatus 902 includes a communication interface 903, a CPU 905, and a memory 908, which are connected to each other via a bus 920. The communication interface 903 executes communication with a communication interface 151 of the HMD 100 via an antenna 904 and the communication network 910. A program 906 and information data 907 are stored in the memory 908.

Here, when an event occurs, the key content pair information register 211 in the HMD 100 illustrated in FIG. 2 transmits the generated key content pair information 216 to the server apparatus 902 outside the HMD 100 via the communication interface 151, and stores it in the memory 908 of the server apparatus 902. On the other hand, at a time of apparatus activation, the key content pair restorer 212 obtains the key content pair information 216 from the server apparatus 902 via the communication interface 151, and stores it in the memory 128 of the own apparatus.

Main Effect of Fifth Embodiment

As described above, by using the head mounted processing apparatus (HMD) according to the fifth embodiment, in addition to the various effects described in the first embodiment, it becomes possible to further improve convenience of the user. Specifically, since the key content pair information 216 is stored on the server apparatus 902, the user can use the registration key even in a case where another HMD 100 with the same model is used, for example.

Note that a storage destination of the program corresponding to various contents of the HMD 100 is not limited to the memory 128 of the own apparatus, and may be the memory 908 of the server apparatus 902. In this case, the HMD 100 appropriately obtains a desired program 906 from the server apparatus 902 by streaming or downloading. This makes it possible to reduce the memory capacity of the HMD 100, for example.

Note that the present invention is not limited to the embodiments described above, and various modifications are contained. For example, the embodiments described above have been explained in detail for explaining the present invention clearly. The present invention is not necessarily limited to one that includes all configurations that have been explained. Further, a part of the configuration of one embodiment can be replaced by a configuration of the other embodiment. Further, a configuration of the other embodiment can be added to a configuration of one embodiment. Further, a part of the configuration of each of the embodiments can be added to the other configuration, deleted, or replaced thereby.

Further, a part or all of the respective configuration described above, the functions, processing units, and processing means may be realized by hardware that is designed by an integrated circuit, for example. Further, the respective configuration described above and the functions may be realized by software so that a processor interprets programs realizing the respective functions and execute the interpreted programs.

Information on programs, tables, and files, which realize the respective functions, can be placed in a recording device such as a memory, a hard disk, or an SSD (Solid State Drive), or a recording medium such as an IC card, an SD card, or a DVD.

Further, control lines and information lines are illustrated so long as they are thought to be necessary for explanation. All of the control lines and the information line are not necessarily illustrated on a product. In fact, it may be considered that almost all of the components are connected to each other.

REFERENCE SIGNS LIST

100: head mounted processing apparatus (HMD), 111: camera, 112: right eye visual line detector, 113: left eye visual line detector, 114: vibration generator, 115: stimulus generator, 116: outer peripheral sound microphone, 117: vocalized sound microphone, 118: headphone, 119: operational input interface, 120: display (display unit), 121: depth sensor, 122: acceleration sensor, 123: gyro sensor, 124: geomagnetic sensor, 125: CPU, 126: program, 127: information data, 128: memory, 129: biological sensor, 132: proximity sensor, 140: bus, 150: antenna, 151: communication interface, 201: various kinds of sensors, 205: content controller, 206: content executor, 210: candidate key extractor, 211: key content pair information register, 212: key content pair restorer, 215: key setting information, 216: key content pair information, 601: user, 602: clock, 603: calendar, 604: operation reproducing content, 605: document creating content, 902: server apparatus, 903: communication interface, 904: antenna, 905: CPU, 906: program, 907: information data, 908: memory, 910: communication network, 920: bus, 1001, 1002: access point apparatus.

The invention claimed is:

1. A head mounted processing apparatus for providing various kinds of information to a user via a visual sense or an auditory sense in a state where the head mounted processing apparatus is worn on a head of the user, the head mounted processing apparatus comprising:
   a display configured to display a predetermined image;
   a camera configured to capture an image outside the head mounted processing apparatus;
   a memory;
   a content executor configured to execute content; and
   a content controller configured to control the content executor,
   wherein the content controller includes:
   a key content pair information register configured to associate, when an event occurs to terminate the head mounted processing apparatus based on an instruction from the user or an apparatus termination signal, a state of the content at a time of event occurrence with a registration key obtained from a first image of the camera at the time of the event occurrence, and store the state of the content at the time of the event occurrence and the registration key in the memory as key content pair information; and
   a key content pair restorer configured to determine, when the head mounted processing apparatus is activated, whether or not a second image of the camera at a time of the apparatus activation conforms with the registration key, obtained from the first image of the camera at the time of the event occurrence, on a basis of the key content pair information, and restore the state of the content, at the time of the event occurrence, corresponding to the registration key which conforms with the second image in a case where the second image conforms with the registration key.

2. The head mounted processing apparatus according to claim 1,
   wherein the key content pair information register is configured to store a type of the content that is executing when the event occurs in the memory as the state of the content at the time of the event occurrence, and
   wherein the key content pair restorer is configured to activate the content corresponding to the registration key.

3. The head mounted processing apparatus according to claim 2,
   wherein the key content pair information register is configured to store an execution state on the content in addition to the type of the content that is executing when the event occurs in the memory as the state of the content at the time of the event occurrence, and
   wherein the key content pair restorer is configured to activate the content corresponding to the registration key, and restore the execution state on the content.

4. The head mounted processing apparatus according to claim 1,
   wherein the key content pair restorer is configured to display a specified initial screen after the head mounted processing apparatus is activated on the display in a case where a cancellation instruction from the user is received within a predetermined period of time after the state of the content is restored.

5. The head mounted processing apparatus according to claim 1,
   wherein the key content pair information register is configured to store information on one object included in a central portion of the first image of the camera at the time of the event occurrence in the memory as the registration key, and
   wherein, in a case where a plurality of the registration keys is included in the second image of the camera at the time of the apparatus activation, the key content pair restorer is configured to display, on the display, a selection screen for causing the user to select any one of a plurality of states of the content respectively corresponding to the plurality of registration keys.

6. The head mounted processing apparatus according to claim 5,
   wherein the key content pair restorer is configured to respectively give weights to the registration keys in the second image of the camera at the time of the apparatus activation so that the closer the registration key is to a central portion, the greater the weight is given, and display the selection screen in which weighting is made.

7. The head mounted processing apparatus according to claim 1, further comprising:
   a sensor configured to detect various states,
   wherein the content controller is configured to use a combination between the first image of the camera and a detection result of the sensor as the registration key.

8. The head mounted processing apparatus according to claim 7,
   wherein the sensor is a biological sensor configured to detect biological information of the user.

9. The head mounted processing apparatus according to claim 7,
   wherein the sensor is a sensor configured to detect posture of the head mounted processing apparatus.

10. The head mounted processing apparatus according to claim 1, further comprising:
    a communication interface configured to execute wireless communication with an external device,
    wherein the key content pair information register is configured to store the key content pair information in a server apparatus outside the head mounted processing apparatus via the communication interface when the event occurs, and
    wherein the key content pair restorer is configured to obtain the key content pair information from the server apparatus via the communication interface when the head mounted processing apparatus is activated.

11. A head mounted processing apparatus for providing various kinds of information to a user via a visual sense or an auditory sense in a state where the head mounted processing apparatus is worn on a head of the user, the head mounted processing apparatus comprising:
- a display configured to display a predetermined image;
- a sensor configured to detect various states;
- a memory;
- a content executor configured to execute content; and
- a content controller configured to control the content executor,
- wherein the content controller includes:
  - a key content pair information register configured to associate, when an event occurs to terminate the head mounted processing apparatus based on an instruction from the user or an apparatus termination signal, a state of the content at a time of event occurrence with a registration key obtained from a first detection result of the sensor at the time of the event occurrence, and store the state of the content at the time of the event occurrence and the registration key in the memory as key content pair information; and
  - a key content pair restorer configured to determine, when the head mounted processing apparatus is activated, whether or not a second detection result of the sensor at a time of the apparatus activation conforms with the registration key, obtained from the first detection result of the sensor at the time of the event occurrence, on a basis of the key content pair information, and restore the state of the content, at the time of event occurrence, corresponding to the registration key which conforms with the second detection result in a case where the second detection result conforms with the registration key.

12. The head mounted processing apparatus according to claim 11,
- wherein the key content pair information register is configured to store a type of the content that is executing when the event occurs in the memory as the state of the content at the time of the event occurrence, and
- wherein the key content pair restorer is configured to activate the content corresponding to the registration key.

13. The head mounted processing apparatus according to claim 12,
- wherein the key content pair information register is configured to store an execution state on the content in addition to the type of the content that is executing when the event occurs in the memory as the state of the content at the time of the event occurrence, and
- wherein the key content pair restorer is configured to activate the content corresponding to the registration key, and restore the execution state on the content.

14. The head mounted processing apparatus according to claim 11,
- wherein the sensor is a sensor configured to detect posture of the head mounted processing apparatus.

15. A head mounted processing apparatus for providing various kinds of information to a user via a visual sense or an auditory sense in a state where the head mounted processing apparatus is worn on a head of the user, the head mounted processing apparatus comprising:
- a display configured to display a predetermined image;
- a memory;
- a communication interface configured to execute wireless communication with an external device;
- a content executor configured to execute content; and
- a content controller configured to control the content executor,
- wherein the content controller includes:
  - a key content pair information register configured to associate, when an event occurs to terminate the head mounted processing apparatus based on an instruction from the user or an apparatus termination signal, a state of the content at a time of event occurrence with a registration key obtained from first data received by the communication interface at the time of the event occurrence, and store the state of the content at the time of the event occurrence and the registration key in the memory as key content pair information; and
  - a key content pair restorer configured to determine, when the head mounted processing apparatus is activated, whether or not second data received by the communication interface at a time of the apparatus activation conforms with the registration key, obtained from the first data received by the communication interface at the time of the event occurrence, on a basis of the key content pair information, and restore the state of the content, at the time of the event occurrence, corresponding to the registration key which conforms with the second data in a case where the second data conforms with the registration key.

16. The head mounted processing apparatus according to claim 15,
- wherein the key content pair information register is configured to store a type of the content that is executing when the event occurs in the memory as the state of the content at the time of the event occurrence, and
- wherein the key content pair restorer is configured to activate the content corresponding to the registration key.

17. The head mounted processing apparatus according to claim 16,
- wherein the key content pair information register is configured to store an execution state on the content in addition to the type of the content that is executing when the event occurs in the memory as the state of the content at the time of the event occurrence, and
- wherein the key content pair restorer is configured to activate the content corresponding to the registration key, and restore the execution state on the content.

18. The head mounted processing apparatus according to claim 15,
- wherein the first and second data received by the communication interface are identification information of a beacon.

19. The head mounted processing apparatus according to claim 15, further comprising:
- a camera configured to capture an image outside the head mounted processing apparatus,
- wherein the content controller is configured to use a combination between the first data received by the communication interface and the image of the camera as the registration key.

* * * * *